United States Patent
Staczek

(10) Patent No.: US 9,898,517 B2
(45) Date of Patent: Feb. 20, 2018

(54) DECLARATIVE SYNCHRONIZATION OF SHARED DATA

(75) Inventor: Jason Staczek, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 2841 days.

(21) Appl. No.: 11/408,644

(22) Filed: Apr. 21, 2006

(65) Prior Publication Data

US 2013/0166507 A1    Jun. 27, 2013

(51) Int. Cl.
    G06F 17/30    (2006.01)
    G06F 9/54     (2006.01)
    H04L 29/08    (2006.01)

(52) U.S. Cl.
    CPC ........ G06F 17/30575 (2013.01); G06F 9/542 (2013.01); H04L 67/1095 (2013.01)

(58) Field of Classification Search
    CPC ......... G06F 17/30067; G06F 17/30174; G06F 17/30176; G06F 17/30212; G06F 17/30575; G06F 17/3082; G06F 17/30038; G06F 17/30607; G06F 17/30371; G06F 17/30578; G06F 17/30581; G06F 17/30525; G06F 17/30197; G06F 17/30168; G06F 17/30368; G06F 17/30584; G06F 17/30215; G06F 17/30194; G06F 17/30377; G06F 17/30592
    USPC .................. 707/10, 201, 203, 610, 640, 661
    See application file for complete search history.

(56) References Cited

U.S. PATENT DOCUMENTS

| 5,544,135 | A  | * | 8/1996  | Akin, Jr. ............ G11B 5/59616 360/46 |
| 5,924,096 | A  | * | 7/1999  | Draper .............. G06F 17/30575 707/999.002 |
| 6,141,794 | A  | * | 10/2000 | Dice et al. .................... 717/118 |
| 6,973,460 | B1 | * | 12/2005 | Mitra ....................... G06F 8/10 707/999.101 |
| 7,003,587 | B1 | * | 2/2006  | Battat et al. .................. 709/227 |
| 7,203,678 | B1 | * | 4/2007  | Petropoulos ...... G06F 17/30864 707/775 |

(Continued)

OTHER PUBLICATIONS

IEEE 100, The Authoritative Dictionary of IEEE Standards Terms, 2000, Seventh Edition, p. 39.*

(Continued)

*Primary Examiner* — Ashish K Thomas
*Assistant Examiner* — Rezwanul Mahmood
(74) *Attorney, Agent, or Firm* — Wolfe-SBMC

(57) ABSTRACT

Methods and apparatus, including computer systems and program products, related to declarative synchronization of shared data. One method includes receiving one or more changes to data maintained by one of multiple computer programs having respective local copies of the data, identifying an event characterizing synchronization of the data maintained by the computer program with the other computer programs (e.g., with a local copy managed by the other computer program), and initiating synchronization of the changes with one of the other programs having respective local copies (e.g., with the local copy managed by the other program) in response to the event occurring. The event can be characterized by an annotation. Identifying an event can include reading a property of a data object (e.g., in a data object graph of shared data).

20 Claims, 3 Drawing Sheets

(56) References Cited

U.S. PATENT DOCUMENTS

| | | | | |
|---|---|---|---|---|
| 7,464,383 | B1* | 12/2008 | Dow | G06F 9/4428 707/999.201 |
| 7,720,890 | B2* | 5/2010 | Rao | H04L 67/1095 707/610 |
| 7,747,561 | B1* | 6/2010 | Gupta | G06F 17/30578 707/999.204 |
| 8,631,386 | B2* | 1/2014 | Doshi | G06F 8/315 717/106 |
| 2001/0054042 | A1* | 12/2001 | Watkins | G06F 17/30126 707/999.1 |
| 2003/0084073 | A1* | 5/2003 | Hotti | G06F 17/30581 707/999.201 |
| 2003/0137536 | A1* | 7/2003 | Hugh | G06F 9/4443 715/744 |
| 2003/0227487 | A1* | 12/2003 | Hugh | G06F 17/30958 707/E17.011 |
| 2004/0122653 | A1* | 6/2004 | Mau | G06F 17/30654 707/E17.068 |
| 2004/0143814 | A1* | 7/2004 | de Jong | G06F 9/44589 717/104 |
| 2004/0172423 | A1* | 9/2004 | Kaasten | G06F 17/30176 707/999.201 |
| 2004/0220926 | A1* | 11/2004 | Lamkin et al. | 707/3 |
| 2005/0144622 | A1* | 6/2005 | Ballinger | G06F 9/4435 719/315 |
| 2005/0203950 | A1* | 9/2005 | Rajan | G06F 17/30286 707/999.103 |
| 2006/0089974 | A1* | 4/2006 | Kobayashi | G06F 9/542 709/213 |
| 2006/0294333 | A1* | 12/2006 | Michaylov | G06F 9/466 711/168 |
| 2007/0032253 | A1* | 2/2007 | Bingham et al. | 455/502 |
| 2007/0124326 | A1* | 5/2007 | Polk | G06F 17/30421 707/999.1 |
| 2007/0174246 | A1* | 7/2007 | Sigurdsson | G06F 17/30176 707/999.003 |
| 2007/0190978 | A1* | 8/2007 | White | H04L 12/583 455/412.1 |
| 2007/0277056 | A1* | 11/2007 | Varadarajan | G06F 11/1438 714/15 |
| 2009/0106744 | A1* | 4/2009 | Li | G06F 8/447 717/151 |
| 2013/0166507 | A1* | 6/2013 | Staczek | G06F 17/30575 707/625 |
| 2014/0067925 | A1* | 3/2014 | Strong | G06F 17/30038 709/203 |

OTHER PUBLICATIONS

Chandandeep Pabla, SyncML intensive—A beginner's look at the SyncML protocol and procedures, dated Apr. 1, 2002, http://www-128.ibm.com/developerworks/wml/library/wi-syncml2, printed Oct. 4, 2006, pp. 1-9.

* cited by examiner

DECLARATIVE SYNCHRONIZATION OF SHARED DATA

BACKGROUND

The present disclosure relates to client/server synchronization, and in particular, declarative synchronization of data.

In a client/server system, shared data can exist as a local copy at one or more clients. A master copy of the data can be maintained by a server that has a client/server relationship with the clients. To ensure that clients have an accurate view of data and the master copy is current, data can be synchronized among the clients and the server. For example, changes at a client can be reflected at a server. Similarly, changes committed to a master copy at a server can be reflected at clients.

SUMMARY

In one aspect, a method includes receiving one or more changes to a copy of data maintained by one of multiple computer programs having respective local copies, identifying an event characterizing synchronization of the copy maintained by the computer program with another computer program (e.g., with a local copy managed by the other computer program), and initiating synchronization of the changes with one or more of the computer programs having the respective local copies (e.g., with the local copy managed by the other program) in response to the event occurring. In the method, the event is characterized by an annotation associated with the data.

In another aspect, a computer program product is operable to cause one or more data processing apparatus to perform operations that include those of the method above.

In another aspect, a system includes a schema of data and a computer program. In that system, the schema is associated with one or more annotations characterizing synchronization for one or more changes to the data. Also, the computer program is operable to compile the schema and the annotations to generate a runtime representation of the data such that the runtime representation is operable to identify an event characterized by an annotation associated with the data and initiate synchronization of the changes with other copies of the data in response to the event occurring.

In another aspect, a computer program product is operable to cause one or more data processing apparatus to perform operations that include receiving a schema of data that has annotations characterizing synchronization for one or more changes to the data, and compiling the schema and the annotations to generate a runtime representation of the data. In the computer program, the runtime representation is operable to identify an event characterized by an annotation associated with the data, and initiate synchronization of the changes with other copies of the data in response to the event occurring.

In another aspect, a method includes receiving a schema of data that has annotations characterizing synchronization of the data, and compiling the schema and the annotations to generate a runtime representation of the data. In the method, the runtime representation is operable to identify an event characterized by an annotation associated with the data, and initiate synchronization of the changes with other copies of the data in response to the event occurring.

In another aspect, a system includes a server system and multiple client systems having respective local copies of data. At least one of the client systems can perform operations that include receiving one or more changes to a copy of the data maintained by a computer program of the client system; identifying an event characterizing synchronization of the copy maintained by the computer program with one or more of the client systems where the event is characterized by an annotation associated with the data; and initiating synchronization of the changes with one or more of the local copies in response to the event occurring. The server system can assist in the synchronization of the changes with the one or more of the local copies.

Various implementations can include one or more of the following features. Identifying an event associated with synchronization can include reading a property of a data object that identifies the event at which synchronization of the data object is to be initiated.

The data object can include byte code executable in a runtime system in conformance with a JAVA standard for runtime systems. The data object can include code that was written in languages including JAVA, JavaScript, ActionScript, and the like. The property of the data object can result from compilation of the annotation associated with the data. A schema of the data and associated annotations can be written in accordance with a tree-structured format (e.g., RelaxNG or XML (eXtensible Markup Language)) and a compiler can be used to generate a runtime representation of the data in accordance with the schema. The tree-structured format can specify that annotations are to be written for a granularity of one or more nodes of a tree and annotations of a node apply to nodes in the tree nested within the node (e.g., to child nodes of a parent node in a tree). Initiating synchronization of the changes can include buffering the changes in an outgoing queue of changes at a client system where the computer program resides.

An additional feature can include committing the changes to a server system from a client system where the computer program resides. Committing the changes to a server system can include committing the changes in response to a request from the server system to receive changes queued by the client system. Committing the changes to a server system can include committing the changes as a result of a push of the changes to the server system from the client system.

An additional feature can include a first buffering of the changes at the computer program such that the changes are unavailable for being committed to a server system prior to the initiating synchronization of the changes. Initiating synchronization of the changes can include a second buffering of the changes at the computer program such that the changes are available for being committed to the server system.

The first buffering of the changes at the computer program can include marking an object graph to indicate which of one or more data objects correspond to the changes.

Events can be linked to user interaction such that user interaction, or lack thereof, results in an event that causes synchronization to be initiated.

Identifying an event associated with synchronization of the local copy can include identifying that synchronization of the changes is to be initiated at an end of an interval of time if further changes fail to be detected before the end of the interval; identifying that synchronization of the changes is to be initiated if the changes are detected at an end of an interval of time; identifying that synchronization of the changes is to be initiated if the changes are to be synchronized immediately; identifying that synchronization of the changes is to be initiated if focus of a user interface element is changed; identifying that synchronization of the changes is to be postponed until an associated node defined as a master is changed; or identifying some combination of these events.

Another feature can include generating event handling stubs to receive notifications of the changes to the data (e.g., stubs generated by a schema compiler for use by a developer).

Particular embodiments of the invention can be implemented to realize one or more of the following advantages. Changes to data shared among multiple clients can be reflected across the clients automatically such that the client applications need not be concerned with polling for updates. A schema of data that is to be shared among multiple clients can include annotations that specify behaviors for synchronizing the data. For example, annotations can specify events that should trigger synchronization of data from a client to a server, which can, in turn, cause synchronization of the data across other clients. Client policies for committing changes to data to a server can be used in combination with server policies for synchronizing data. For example, annotations that specify an event to trigger synchronizing data from a client to the server can be used to batch changes in an outgoing queue of a client and those changes can be pushed to a server or pulled to a server depending on the server's policies (e.g., every five minutes the server can poll outgoing queues of clients to determine if changes to shared data should be committed to the server). As annotations can specify units of data that are to be synchronized, a large unit of data comprising smaller units (e.g., a data structure having multiple properties) need not be synchronized as a whole, which can reduce resource usage during synchronization (e.g., reduce network bandwidth usage).

The annotation language can be interpreted by a program that generates runtime objects that represent shared data at clients. That program can generate runtime objects representing shared data in a generic fashion such that the program need not be changed for different types of client applications. For example, two shared data schemas can be created for a first and a second client application and the same program can be used to compile the schemas and generate appropriate runtime objects that represent shared data.

Annotations can be used for a tree-structured data schema and the annotations can have a hierarchical application such that, for example, annotations for a parent node in a tree apply to child nodes of that parent node. Different annotations can be used for different units of data such that different synchronization behaviors can apply to various portions of shared data.

The annotations can improve an end user's experience (e.g., an end-user of a client application that synchronizes shared data in accordance with annotations). For example, an annotation can specify that a particular piece of data is only to be synchronized during periods of keyboard or mouse inactivity of at least some time interval. Such annotations can avoid unnecessary user interruption during synchronization activity, and, efficiently utilize a client's resources (e.g., by synchronizing during inactivity rather than burdening a client program with synchronization and user interaction).

Annotations can decrease client code complexity. Since synchronizing policies can be specified declaratively and implemented automatically, in some variations, a developer of a client program can safely ignore that data is being shared with other clients. For example, a client program need not poll for updates, the code need not be customized to be aware that other clients exist, and the developer can treat data as if it were local.

Annotations can define policies that preserve data consistency. For example, annotations can specify that all parts of an address are to be synchronized atomically such that a client cannot edit and commit changes to a "zip code" value without also committing a value for a "state" field (e.g., such that both a zip code and state are synchronized as a unit, and input of a zip code is synchronized with corresponding input of a state). Similarly, annotations can protect groups of related data. For example, a user A can edit an address, and that user might not wish to see a user B's changes applied on a field-by-field basis (A enters WA for state and B immediately enters the zip for CA). The annotations can commit all of A's changes to the related fields before applying all of B's changes.

The annotations can also specify how data is to be handled if a client becomes disconnected. For example, annotations can specify that a client should refuse further changes, or that a client should batch changes for synchronizing when reconnected.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
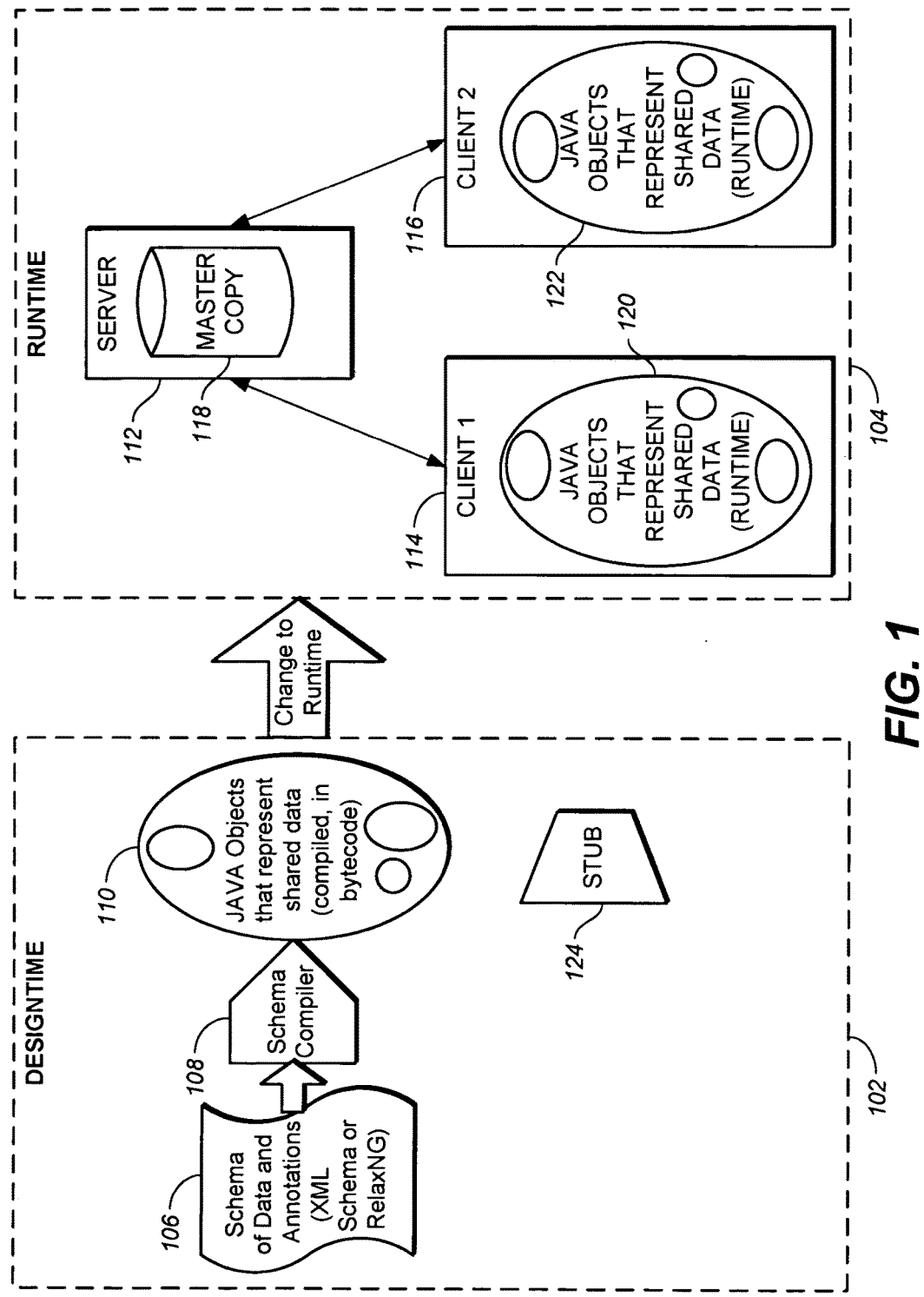
FIG. 1 is a diagram of example designtime and runtime environments of data that can be shared across multiple clients.

FIG. 1 is a diagram of example designtime and runtime environments 102, 104 of data that can be shared across multiple clients 114, 116. In general, a schema of data, such as a schema 106 in the designtime environment 102, can include data that is to be shared and annotations of the data. The annotations can declare synchronization behaviors that should be followed for associated data. For example, data can have an associated annotation that declares the data should be synchronized as soon as changes to the data are made. The synchronization behaviors specified in annotations can be client-side synchronization behaviors that describe events at a client at which changes to a local copy of data are available for committing to a server.

The designtime environment 102 represents an environment in which a schema of annotations, such as a schema 106 in the designtime environment 102, can be drafted and compiled before being used in a runtime environment. The schema 106 can be drafted in a text editor or other development environment. The schema 106 includes a description of data that is to be shared and annotations that describe client-side synchronization behaviors that should be followed for the data. The schema 106 can be drafted in accordance with a tree-structured language, such as XML (eXtensible Markup Language) or Relax NG and the annotations can be attributes of the data in that language. The following is an example of data with an annotation declaring a synchronization behavior:

<Vcard syncable="yes" trigger="focus">

In the above example, the XML tag Vcard represents a Vcard (virtual business card) set of data, the "yes" value for the syncable attribute can indicate that the Vcard data is synchronized with a server and across clients, and the trigger attribute can be an annotation describing an event upon which a Vcard's data is to be synchronized. For example, the value "focus" of the trigger attribute can indicate that a Vcard should be synchronized if focus is lost from a Vcard that is being edited (e.g., if a window including a Vcard loses focus (e.g., a component of a graphical user interface which is currently selected has focus), changes to the Vcard data can be synchronized).

As the annotations can be used for a tree-structured data schema, the annotations can have a hierarchical application such that, for example, annotations for a parent node in a tree apply to child nodes of that parent node. Different annotations can be used for different units of data such that different synchronization behaviors can apply to various portions of shared data. Also, policies for resolving precedence of nested annotations can be enforced. For example, a parent node could have an annotation declaring that the parent node (and, by virtue of this annotation applying to the parent node, the child nodes of the parent can also have this policy) should be synchronized immediately; whereas, the child node has an annotation declaring that the child node should be synchronized only at the end of every five minutes. In that example, default logic can define that child nodes should always have precedence over parent nodes, except when a parent node has an annotation declaring that changes to data be synchronized immediately. For example, if changes to the child are normally published at the end of a five minute interval; yet, when changes are made to the parent node, the changes of the parent node and the child node are to be immediately synchronized. In various implementations, policies and precedence of policies can vary (e.g., depending on a type of policy or the relationship between nodes, such as parent and child).

The schema of annotations 106 in the designtime environment 102 can be the input of a schema compiler 108, which can compile the schema 106, including both data and annotations for the data, to generate JAVA objects 110 (in variations, other types of objects can be generated, such as objects in other languages, including ActionScript, Javascript, and the like). The schema compiler 108 interprets the annotations which are written in accordance with an annotation language. Based on an interpretation of the annotations, the schema compiler 108 can, for example, use generic sections of code, which are associated with a synchronization behavior, and properties of the data that is associated with the annotations, to generate JAVA objects 110. The JAVA objects 110 implement specified synchronization behaviors for specified data (e.g., the JAVA objects 110 are in byte code executable in a runtime system in conformance with a JAVA standard for runtime systems). In this manner of generating a runtime version of the data that is to be shared (e.g., generating the JAVA objects 110), generic code can be used to implement synchronization behaviors for data and customized application code need not be drafted for a set of data that is to be shared. For example, a first application and a second application can be developed and the data used for each of the applications can have synchronization behaviors that are generated by the schema compiler 108; yet, different versions of the schema compiler 108 need not exist to compile a schema for each application (e.g., the schema compiler 108 need not be customized for each application or have application-specific code).

In the designtime environment 102, one or more of the JAVA objects 110 are generated for a unit of data (e.g., a unit can be a node of a tree-structured data model representing the data), and the JAVA objects 110 represent a runtime version of the data in the schema 106 that is input to the schema compiler 108. The JAVA objects 110 include the synchronization behaviors for respective units of data. Following the earlier Vcard example, the Vcard unit of data can be represented by a JAVA object that has compiled code that represents the synchronization behavior that occurs on an event associated with "focus." For example, changes to the Vcard object in a runtime environment can cause the Vcard object to call code that synchronizes the changes to the Vcard in response to a loss of focus.

The JAVA objects 110 can be generated as an object graph. Operations on the object graph can be used to access and edit the JAVA objects 110. For example, a get command can be used to access a local copy of data (e.g., Vcard.address.get( ) can be used to get an address of a Vcard), a set command can be used to edit data (e.g., Vcard.address.set ("1 Main St") can be used to change the object graph), and an add command can be used to add data (e.g., Vcard.phonenumber.add ("Cell phone","555-555-555") can be used to add a phone number labeled "Cell phone").

In the runtime environment 104, a server 112 interacts with a first and second client 114, 116 to synchronize shared data across the clients 114, 116. The server 112 has a master copy of the data 118. The master copy 118 need not always be synchronized with local copies of the data that are in the form of JAVA objects 120, 122 at the clients 114, 116. For example, the JAVA objects 120 maintained by the first client 114 can have recent changes to them that have not yet been committed to the master copy 118.

The clients 114, 116 are clients in the sense of being client programs (e.g., a client program having a client/server relationship with a server program); although, the term client, as used herein, can refer to a client system (e.g., a computer system where a client program resides and the computer system having a client/server relationship with a server computer system). In any case, a client program can be referred to as a tool (e.g., a computer program), and, that tool can be used to access services offered by a server program. Also, a client program can be made of one or more computer programs (e.g., a client program can be an amalgamation of multiple programs). Similarly, the server 112 is a server in the sense of being a server program; although, the term server, as used herein, can refer to a server system (e.g., a computer system where a server program resides). A computer system can be a client system or server system by having a client or system program, respectively, residing on the computer system, where, from the view of the relationship of a client and server program, a client/server relationship can exist. A computer system need not be only a client system or a server system. For example, for one set of client and server programs, a computer system can be a client system by having a client program; yet, the computer system can be a server system by having a server program from another set of client and server programs. Although FIG. 1 depicts a single server 112, a client/server system need not be limited to one server. Also, a client/server system can have periods during which clients and servers are not connected to each other. For example, the server 112 need not be connected to the first client 114 until a time at which the first client 114 has data available for synchronization with the server 112.

In some implementations, changes to a local copy of data at one of the clients 114, 116 can be committed to the server 112 and synchronized with another client's local copy of data automatically and transparently from the view of an application writer of the clients 114, 116. For example, a change to data at the first client 114 can be committed to the server 112 in accordance with annotations for synchronization. In response to changes to the master copy of the data 118, the JAVA objects 122 at the second client 116 can automatically update the data at the second client 116 such that an application writer of the second client 116 need not be concerned with polling for updates. For example, the server 112 can publish updates to the second client 116, and the JAVA objects 122 at the second client 116 can update a user interface displaying the data that was changed to reflect the changes. In various implementations, runtime components in addition to or instead of JAVA objects can be generated and/or used to monitor changes to data and implement features of the subject matter described herein.

Figure 2:
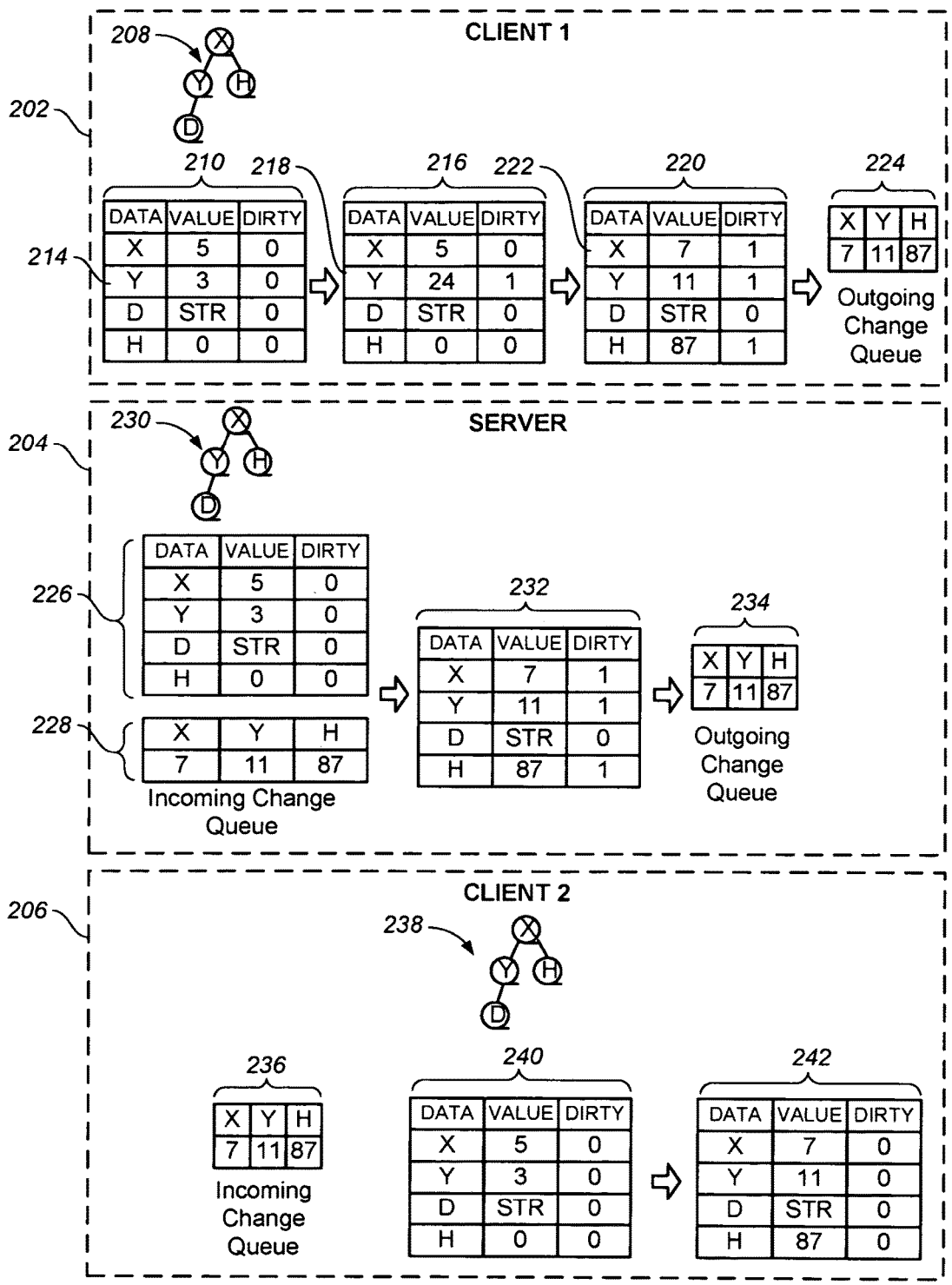
FIG. 2 is a diagram of example synchronization of data of a first client with data of a server and a second client.

FIG. 2 is a diagram of example synchronization of data of a first client 202 with data of a server 204 and a second client 206. In general, the diagram depicts that changes to data at the first client 202 are placed on an outgoing change queue 224, the changes are received by the server 204 at an incoming change queue 228, the server 204 applies the changes to a master copy of data, the server 204 places the changes on an outgoing queue 234 for publishing to clients (e.g., the second client 206), the changes are received by the second client 206 at an incoming change queue 236, and the second client 206 applies the changes to the second client's 206 local copy of data.

At the first client 202, a tree 208 is a model of the data that is in a table 210. Similar trees 230, 238 that model data are at the server 204 and the second client 206 to reflect similar models of data. The table 210 is a representation of the data in the tree 208 and need not be the form of a data structure in which the data is stored at the first client 202 (e.g., an m-branch tree can be the underlying data structure of the tree 202 and corresponding values and properties of nodes of the tree 208). In the table 210, data have associated values and "dirty" bits that indicate whether the data has changed locally since changes have been placed in an outgoing change queue. For example, in the first table 210 of the first client 202, the data Y 214 has the value 3 and the associated dirty bit is zero indicating that the local value of the data has not changed since changes were placed in the outgoing change queue (or, since the value was generated; e.g., at initialization).

A second table 216 at the first client 202 depicts the data at the first client 202 after the value for Y 218 has changed. In the second table 216, the value for Y is 24. To indicate that Y has changed, an associated dirty bit is set to "1". Were synchronization among the first client 202 and the server 204 to be initiated (e.g., placing the changes in an outgoing change queue), the dirty bit can be cleared. In variations, other stimuli can result in a change of a dirty bit associated with the data. For example, there need not be an outgoing change queue and pushing changes to the server 204 can cause the dirty bit to change.

A third table 220 depicts further changes to the data. For example, the data X 222 has changed to the value 7. The dirty bit is "1" to reflect this change.

A fourth table represents an outgoing queue of changes 224. The outgoing queue of changes 224 may include only those values that have changed (e.g., only those values that had an associated dirty bit set to "1"). In other implementations, other data can be placed in an outgoing queue as well. The changes in the outgoing queue 224 are changes that should be committed to the server 204 (e.g., in a series of client/server communications that synchronizes the changes to a master copy of the shared data at the server 204). In various implementations, not all changes to data need be synchronized upon a synchronization event. For example, some data in a local object graph might not be specified for synchronization (e.g., data that is not considered shared data might not be synchronized).

The addition of items to the outgoing queue of changes can be dictated by client-side synchronization policies that define events upon which changes should be placed on the outgoing queue. Client-side synchronization policies can be used to limit the frequency of events upon which items are added to the outgoing queue of changes (or, in variations, pushed to a server) such that data is not placed in the queue in response to each change to data, and rather, data is placed less frequently on the outgoing queue to reduce communication between the first client 202 and the server 204 (and, further, communication between the server 204 and the second client 206 can be reduced should the changes be synchronized with the second client 206). In this manner of using client-side synchronization policies, resource usage can be reduced. For example, although the data Y changed between the first and second tables 210, 216 and again between the second and third tables 216, 220, a change might not be placed on an outgoing queue until a later event such that the outgoing queue 224 only reflects the latest value of Y and does not reflect the earlier change to Y (e.g., such that fewer changes to Y are indicated in the outgoing queue to reduce data that is transmitted to the server 204).

The client-side synchronization policies can be described in annotations to the data in a designtime environment. For example, the description of the designtime environment 102 of FIG. 1 includes a description of using annotations to define events upon which synchronization can be initiated. Features similar to the designtime environment 102 of FIG. 1 can be used to generate runtime objects that include synchronization behaviors that are specified by annotations.

A software developer of a client application, such as the first client 202 of FIG. 2, can use annotations to specify events upon which the developer desires to have synchronization initiated (e.g., initiated by placing changes on an outgoing queue of changes of a client). For example, a user interface that has a text field which is to include end-user comments can be developed. Because an end-user can continually edit the field (e.g., each letter typed into a text field is a change to the data of the text field), the software developer can limit the synchronization of the field across a server and other clients in an effort to conserve resources. For example, the software developer can use an annotation that specifies synchronization of the data in the text field should only be initiated when focus of the text field has been lost. In that example, all of the changes of the text field can be batched together, placed in an outgoing queue in response to a loss of focus, and committed to a server in one communication rather than a series of communications over time that are responsive to each change in the text field. The batching of changes can reduce usage of network bandwidth for synchronization by reducing the amount of communications between a client and a server.

Returning to a description of FIG. 2, the server 204 can have an incoming change queue 228 that includes changes from one or more clients and a copy of the shared data as depicted by a first table 226. As the first table 226 of the server 204 is the same as the first table 214 of the first client 202, the first table 226 of the server does not reflect changes that occurred to the copy of data at the first client 202. The server 204 uses the changes in the incoming change queue 228 to synchronize the master copy of data at the server 204. A second table 232 at the server 204 reflects synchronization of the data.

As part of the process of synchronizing the data, the server 204 can also track changes that need to be synchronized with clients other than the first client 202. These changes can be tracked by a set of dirty bits in the second table 232. When the server 204 is to synchronize changes to the master data with the other clients, the dirty bits can be used to determine which changes are to be made and to generate an outgoing change queue 234. In FIG. 2, the outgoing change queue 234 is generated so that changes to the shared data can be synchronized with the second client 206.

Changes to data queued at the outgoing change queue 234 of the server 204 can be placed on the incoming change queue 236 of the second client. The second client 206 synchronizes the changes with a local copy of the shared data as represented by the first table 240 of the second client 206. The result is that the second client 206 has an updated view of data as depicted in the second table 242 at the second client 206.

In some variations, some or all of the change queues need not be used. For example, the outgoing change queue 224 of the first client 202 and the incoming change queue 228 of the server 204 need not be implemented. In that example, changes can be pushed directly to the server 204 in accordance with synchronization behaviors specified by annotations to the shared data and the server 204 can immediately apply those changes. Queues can be last-in-first-out or first-in-first-out, and may merely act as a buffer of data.

Figure 3:
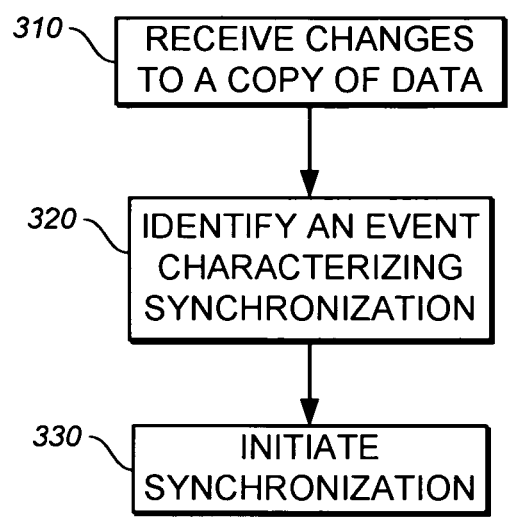
FIG. 3 is a flowchart of an example process of synchronizing data.

FIG. 3 is a flowchart of an example process of synchronizing data. In general, the process involves receiving changes to a copy of data (310), identifying an event that characterizes synchronization (320), and initiating synchronization of data (330). The process of the flowchart can be performed in the example runtime environment 104 of FIG. 1, or, the process can be a characterization of the synchronization described with reference to FIG. 2. The process can be performed in environments other than the runtime environment 104 of FIG. 1 and the process can be implemented with additional or different features than the synchronization of FIG. 2.

Receiving changes to a copy of data (310) can be performed at a client, such as the first client 114 of FIG. 1. In particular, the changes can be received at one or more runtime objects such as the JAVA runtime objects 120. The changes can originate from user input. For example, an end-user of a client can interact through a user interface to change the value of a text field, which causes a change to a runtime object representing the data displayed in the text field (thus, the runtime object receives the changes). For example, an object graph can receive changes by a command, such as the example set command described above (e.g., Vcard.address.set ("1 Main St") can result in the object graph receiving the change of the address to "1 Main St"). Changes can include additions, deletions or alterations (e.g., update) of data.

Identifying an event that characterizes synchronization (320) can also be performed at a client, such as the first client 114. In particular, the client that identifies an event that characterizes synchronization can be the same as the client that received the changes to the data. For example, the JAVA runtime objects 120 of FIG. 1 can identify an event that characterizes synchronization.

The event can be defined by annotations to a data schema that were defined in a designtime environment, such as the designtime environment 102. The event can become part of a compiled runtime object through the use of a compiler, such as the schema compiler 108 of FIG. 1.

Identifying an event can include reading a property of the runtime object that represents the local copy of data. For example, a runtime object Y can represent the data Y in the first client 202 of FIG. 2. The runtime object can receive a change to the data and identify an event associated with the runtime object by reading an attribute of the runtime object. For example, an attribute of the runtime object can be referred to as "syncable" and can have a value specifying an event. The identification of an event can occur in response to the receipt of the change to the data (310) or in response to other stimuli.

Events characterizing synchronization of data can characterize an event, upon which, changes to a local copy of shared data should start to be synchronized with a master copy of data (e.g., the master data 118 at the server 112 of FIG. 1), which can in turn cause synchronization of the changes with copies of data at other clients.

Many types of events can be used to characterize synchronization of data, including an end of an interval of time at which other changes have not yet been detected (e.g., a change can cause a timer to start, where the timer is renewed each time a change occurs, when no changes are detected within the timer's period, the changes can be committed to a server), an end of an interval of time (e.g., a change can cause a timer to start and at the end of the timer the changes can be committed to a server), as soon as changes are detected (e.g., synchronization is to immediately be initiated in response to a change; this can be used, for example, in a time-critical application where changes to data should immediately be reflected to master data), at a loss or change of focus (e.g., synchronization can be initiated in response to a loss of focus of a user interface element), when associated data is changed or synchronized (e.g., synchronization can be postponed until synchronization of data of an associated node defined as a master, such that the synchronization follows a master/slave relationship; this can be useful in an application involving a form document, where changes are only propagated from a client when a form is submitted), and a fixed interval of time (e.g., every five minutes changes can be placed on an outgoing change queue). The events can be represented in an annotation language of shared data, by, for example, the annotations "window," "interval," "immediately," "focus," and "master/slave," respectively, which can be used to generate compiled code. In variations, the events can be guidelines such that the synchronization might not actually start at that time and synchronization can be initiated at a later or earlier time, and this can depend on other factors, such as server-side synchronization policies.

In addition to identifying an event, in variations, the change can be noted. For example, a dirty bit in an object graph can be set for a data object that has changed. Noting the changes can be helpful, for example, such that if synchronization does not occur in response to a change, a change can be noted for synchronization in response to another event.

Also, in addition to identifying an event, in variations, the changes can be reflected locally regardless of whether synchronization is initiated. For example, in response to a change of a value that is received by user input, a pie chart reflecting the value can be updated locally and synchronization of the changes might not be initiated until an event specified in an annotation of a data schema has occurred.

Synchronization of the data (330) can be initiated at the client that receives changes and identifies an event upon which synchronization of the data is to be initiated. In particular, synchronization can be initiated by a runtime object that represents the changed data. Initiating synchronization of the data can include placing changes to data on an outgoing change queue from which a server pulls the changes (e.g., see the description of the outgoing change queue 224 of the first client 202 of FIG. 2), pushing of changes to a server (e.g., if the server included a database containing a master copy of the shared data, an SQL command can be issued), pushing of changes to other clients (e.g., a broadcast to other clients of the changes to the data), or otherwise making changes available for synchronization to a server and/or other clients.

Synchronization performed in response to the initiation of synchronization of data (330) can include synchronization of changes at a client with a server's copy of data and/or changes at a client with other client's local copies of data. For example, changes to a client can be committed to a master copy of shared data at a server and the server can then publish the changes to other clients. As another example, a client can broadcast changes to other clients without using the server as an intermediary for performing synchronization.

Factors can influence when and whether synchronization actually occurs in response to synchronization being initiated. For example, server policies can delay committing of data to a server or publishing of changes to other clients.

Runtime objects that are local copies of data can be generated by a schema compiler. Those runtime objects can operate regardless of the operations of a client application such that synchronization automatically occurs and may require limited further implementation by an application writer of a client. For example, a schema compiler can be provided as a tool to developers of client applications. The schema compiler can generate runtime objects that are distributed with a client application but, operate independently of a client application such that developers need not be concerned with the details of how data is synchronized (e.g., a developer can write an application assuming the data to be local to the client, without concern of how and when the data is updated).

As data can be automatically synchronized, user interface elements can be updated to reflect the changes to the data. To ease implementation of this, event handling stubs can be generated by a schema compiler and provided for use by an application developer. When changes are received at a client, an event notification can be sent and the notification can trigger event handling stubs. For example, in FIG. 1, the schema compiler 108 can generate an event handling stub 124. In some implementations, there can be one stub per an annotation.

As there can be conflicts of changes to shared data (e.g., two clients can change local copies of shared data and the server might have to resolve the difference of the changes), conflict resolution policies can be implemented at clients and/or servers. Conflict resolution can include allowing the last (e.g., most recent) change to win, except in the case of a deletion of data, which can have precedence over all other changes.

In various implementations, annotations to shared data need not specify client user interface components. As an example, objects generated from a schema compiler, such as the schema compiler 108, could be used with any user interface components (e.g., the objects can be specific to a certain set of data but generic to user interface components such that different user interface components can use the same shared data and synchronization of the data can be managed according to the annotations). As another example, a user interface need not exist. For example, a client not having a user interface can, for example, generate periodic electronic mail reports related to changes made to interesting data, and, the client could use the annotations to define events upon which the updates should be generated.

An electronic document does not necessarily correspond to a file. A document may be stored in a portion of a file that holds other documents, in a single file dedicated to the document in question, or in multiple coordinated files.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable device, e.g., a machine-readable storage device, storage medium, or memory device, or multiple ones of them; or it can be a tangible machine-readable propagated signal. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for storing computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving one or more changes, by one or more computing devices, to a copy of data maintained by a computer program being one of a plurality of computer programs having respective local copies of the data;
   marking an object graph, by the one or more computing devices, as a first buffering of the changes at the computer program to indicate which of one or more data objects correspond to the changes such that the changes are unavailable for being committed to the plurality of computer programs, wherein individual data objects represent a runtime version of specific data and implement specified synchronization behavior for the runtime version of the specific data that the individual data object represents, the synchronization behavior being implemented by compiled code, included in the data object, that represents the synchronization behavior that is to occur on the occurrence of an event, the event including a change of focus of a user interface element;
   initiating synchronization of the changes after marking the object graph, by the one or more computing devices, with one or more of the plurality of computer programs having the respective local copies in response to the event occurring, the initiating synchronization of the changes comprising a second buffering of the changes at the computer program such that the changes are available for being committed to the plurality of computer programs, the event causing synchronization of the one or more changes to be postponed until an associated node defined as a master is changed.

2. The method of claim 1, wherein the compiled code comprises byte code executable in a runtime system in conformance with a JAVA standard for runtime systems.

3. The method of claim 1, wherein specified synchronization behaviors are specified by an associated annotation written in accordance with a tree-structured format.

4. The method of claim 3, wherein the tree-structured format specifies that annotations are written for a granularity of one or more nodes of a tree and annotations of a node apply to nodes in the tree nested within the node.

5. The method of claim 1, wherein the initiating synchronization of the changes comprises buffering the changes in an outgoing queue of changes at the one or more computing devices where the computer program resides.

6. The method of claim 1 wherein the plurality of computer programs comprises one or more server systems and one or more client systems.

7. The method of claim 6, wherein the operations comprise committing the changes to the one or more server systems from the one or more client systems where the computer program resides.

8. The method of claim 7, wherein the committing the changes to the one or more server systems comprises committing the changes in response to a request from the one or more server systems to receive changes queued by the one or more client systems.

9. The method of claim 7, wherein the committing the changes to the one or more server systems comprises committing the changes as a result of a push of the changes to the one or more server systems from the one or more client systems.

10. The method of claim 6 wherein the initiating synchronization further comprises bypassing the one or more server systems and synchronizing the one or more changes between two or more of the one or more client systems.

11. The method of claim 1 wherein the specified synchronization behavior includes one set of client-side annotations and one set of server-side annotations.

12. A system comprising:
one or more computing devices configured to perform operations comprising:
receiving one or more changes to a copy of data maintained by a computer program being one of a plurality of computer programs having respective local copies of the data;
marking an object graph as a first buffering of the changes at the computer program to indicate which of one or more data objects correspond to the changes such that the changes are unavailable for being committed to the plurality of computer programs, wherein individual data objects represent a runtime version of specific data and implement specified synchronization behavior for the runtime version of the specific data that the individual data object represents, the synchronization behavior being implemented by compiled code, included in the data object, that represents the synchronization behavior that is to occur on the occurrence of an event, the event including a change of focus of a user interface element;
initiating synchronization of the changes after the marking of the object graph with one or more of the plurality of computer programs having the respective local copies in response to an event occurring as specified in a data object, the initiating synchronization of the changes comprising a second buffering of the changes at the computer program such that the changes are available for being committed to the plurality of computer programs, the event causing synchronization of the one or more changes to be postponed until an associated node defined as a master is changed.

13. The system of claim 12, wherein the specified synchronization behavior is specified by a compiled annotation that includes a reference to a set of data and a trigger attribute describing the event.

14. The system of claim 12, wherein the compiled code comprises byte code executable in a runtime system in conformance with a JAVA standard for runtime systems.

15. The system of claim 14, wherein specified synchronization behaviors are specified by an associated annotation written in accordance with a tree-structured format.

16. The system of claim 12, wherein the initiating synchronization of the changes comprises buffering the changes in an outgoing queue of changes at the one or more computing devices where the computer program resides.

17. The system of claim 12, wherein the plurality of computer programs comprises one or more server systems and one or more client systems.

18. The system of claim 17, wherein the operations comprise committing the changes to the one or more server systems from the one or more client systems where the computer program resides.

19. A machine-readable device, tangibly embodying a computer program product configured to cause a data processing apparatus to perform operations comprising:
receiving one or more changes to a copy of data maintained by a computer program being one of a plurality of computer programs having respective local copies of the data;
marking an object graph as a first buffering of the changes at the computer program to indicate which of one or more data objects correspond to the changes such that the changes are unavailable for being committed to the plurality of computer programs, wherein individual data objects represent a runtime version of specific data and implement specified synchronization behavior for the runtime version of the specific data that the individual data object represents, the synchronization behavior being implemented by compiled code, included in the data object, that represents the synchronization behavior that is to occur on the occurrence of an event, the event including a change of focus of a user interface element;
initiating synchronization of the changes after the marking of the object graph with one or more of the plurality of computer programs having the respective local copies in response to the event occurring, the initiating synchronization of the changes comprising a second buffering of the changes at the computer program such that the changes are available for being committed to the plurality of computer programs, the event causing synchronization of the one or more changes to be postponed until an associated node defined as a master is changed.

20. The machine-readable device of claim 19, wherein the specified synchronization behavior is specified by a compiled annotation that includes a reference to a set of data and a trigger attribute describing the event.

* * * * *